United States Patent Office 3,253,788
Patented May 31, 1966

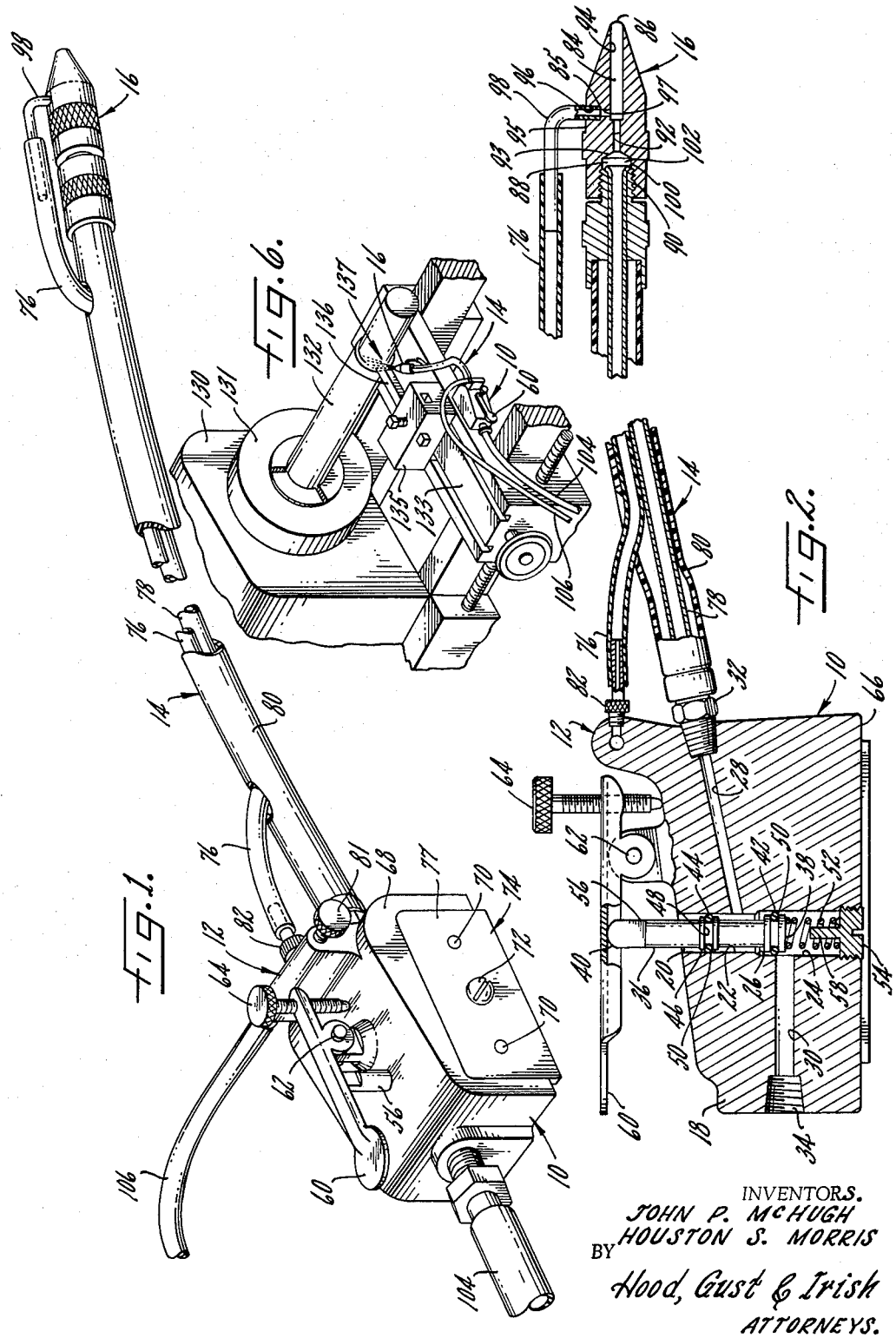

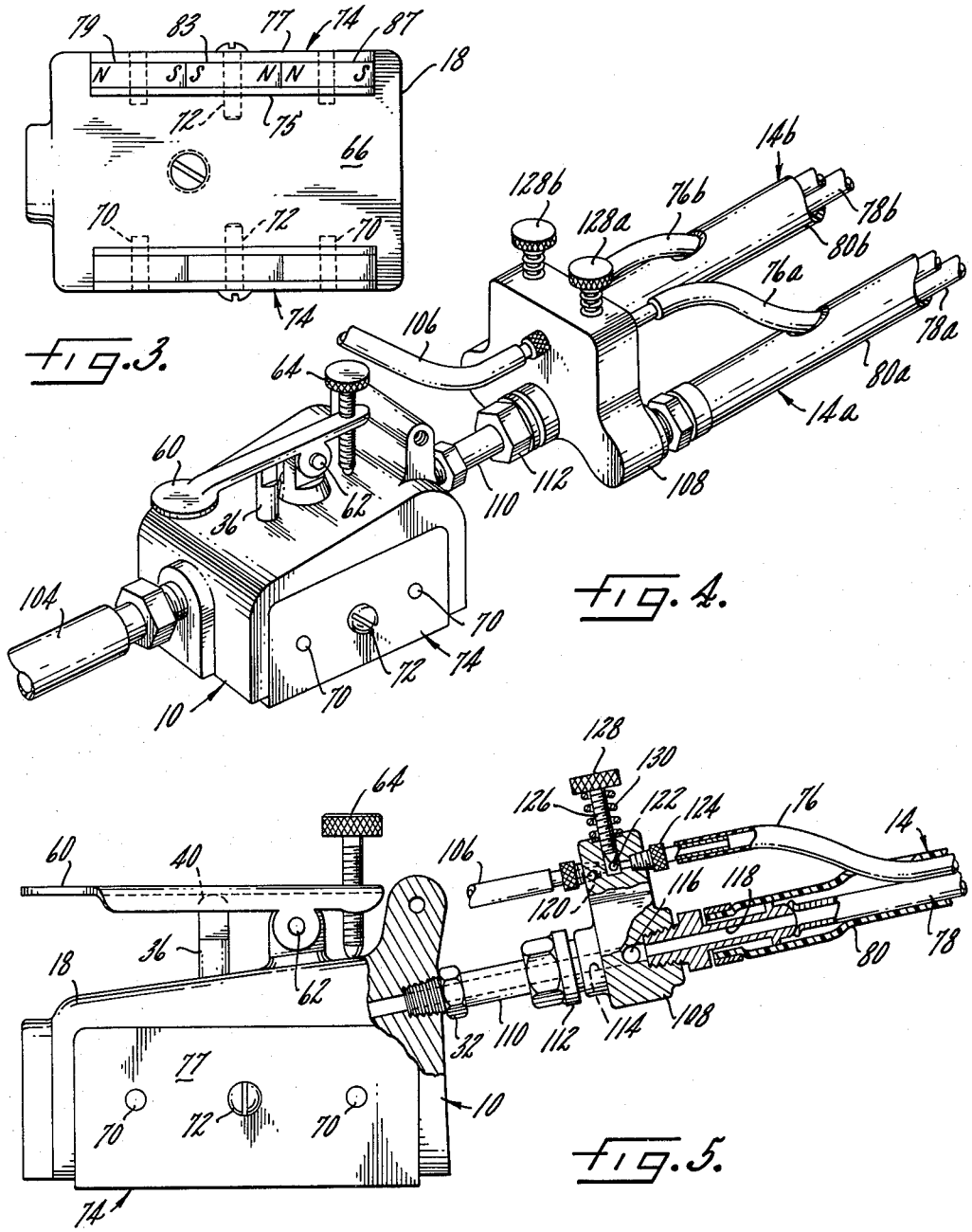

3,253,788
APPARATUS FOR LUBRICATION OF MACHINING OPERATIONS
John P. McHugh and Houston S. Morris, Indianapolis, Ind., assignors to Humostan Corporation, Indianapolis, Ind., a corporation of Indiana
Filed Oct. 24, 1963, Ser. No. 318,686
6 Claims. (Cl. 239—413)

This invention relates generally to apparatus and methods for applying fluids for lubricating and cooling metal machining operations, and more specifically to a device and method for spraying a mist of lubricating coolant.

The use of machine tools for a variety of metal machining operations has been well known for many years and various systems and methods for lubricating and cooling such machining operations have been proposed and used with varied success. A successful metal machining lubrication system must generally perform three functions, the most obvious of the three being adequately to lubricate the cutting operation by means of maintaining a thin lubricant film between the cutting tool and the work piece. The lubricant must also remove heat from the cutting tool and the work piece as it is generated by the cutting operation. The third function of a successful lubricating system is adequately to remove the cutting shavings from the path of the cutting tool, thereby assuring a free cutting surface at all times. It can easily be seen that a successful lubrication system for one machining operation may not be equally successful for another; and that the difficulty of performing the above-mentioned three functions varies greatly with the material of the work piece and the machining operation to be performed.

Of the lubrication systems which have been proposed, the flowing oil bath in which an oil stream is directed at the edge of the cutting tool or onto the work piece is most widely used. It is easily seen why these lubricating methods are successful for some machining operations, as the point of contact between the work piece and the cutting tool is surrounded by lubricant, thereby generally insuring proper lubrication and an efficient and cool heat transfer medium in intimate contact with both pieces likely to be heated by the cutting operation. In most systems, the velocity of the oil flow is adjusted so that the cuttings of the machining operation are easily carried away, thereby satisfying the third of the three above-mentioned functions of a successful lubricating system. However, it is equally obvious that by the use of conventional lubricating and cooling systems, the operator's view of the cutting operation is at least partially obstructed by the flow of lubricant. While most machining lubricants are relatively opaque and thereby capable of obstructing the operator's view of the machining operation even if a relatively thin layer of lubricants is used, the normal practice of surrounding the machining operation with a large excess of lubricant would obstruct an operator's view even if the lubricant were wholly transparent.

In some machining operations, the removal of heat generated by the cutting tool is critical. While heat may be adequately removed in some operations by large amounts of lubricant, other operations are completely inoperative because of the failure of the lubricant to cope with the large amount of heat generated. Using a normal flowing liquid lubrication system, the amount of heat that can be carried away is limited by the heat capacity and the maximum operating temperature of the lubricant. Further, some machining operations are inoperable with normal lubricants because of the relatively low heat conductivity of the lubricant, which results in overheating and possible damage to the cutting tool. This difficulty can be cured only by the use of a lubricant having a higher heat conductivity; these lubricants usually being more expensive.

Still further, in some machining operations, the required lubricant flow for the removal of cuttings cannot be maintained without sacrificing the amount of lubricant available to the cutting operation. This is especially true where the cutting operation is being performed at a location where, in a normal pattern of flowing lubricant, turbulence in the lubricant may occur. If the abundance of cuttings is such that before cuttings are adequately carried away, a lubricant must be maintained at a velocity level at which turbulence may occur, this difficulty is not easily remedied.

It is therefore desirable to provide a lubrication system and method for use on machine tools that provides adequate lubrication to the cutting process, allows the operator of the machine tool directly to view the cutting process, provides for a greater heat removal from the cutting tool and work piece than is possible with a flowing lubricant system and does not sacrifice the removal of cuttings to more desirably achieve the aforementioned functions. It is also desirable to provide a lubrication system and method that is more efficient in performing its functions so that relatively inexpensive lubricants can be substituted for lubricants currently found to be necessary. While spraying and misting devices are relatively old in other fields, to the best of applicant's knowledge no one has heretofore applied such spraying devices to lubricating machine tool operations. As an apparatus for spray or mist lubrication of machining operations must perform the functions of successful lubricating systems, spraying or misting devices heretofore proposed are not applicable to machine tool lubrication. Paint sprayers and sprayers used for cleaning applications do not have to satisfy the requirements demanded of a device that must produce a mist capable of removing heat from the article sprayed. Further, while it may be desirable that cleansing sprayers produce a mist through which an operator can view his cleaning operation and at the same time remove excess solvent and/or a lather, this removal of excess liquid material from a work area is entirely different from the problem encountered in removing cuttings from a machined article. Still further, neither of these sprayer applications requires the apparatus to perform relatively inconsistent functions; i.e., proper lubrication and removal of cuttings. It is therefore desirable to provide a spray or misting apparatus particularly applicable to lubricating machine tool operations.

It is therefore an object of this invention to provide an improved lubrication system for machine tool applications.

Another object of this invention is to provide an improved lubrication system for machine tool applications that allows the operator to view the cutting operation at all times.

It is another object of this invention to provide an improved lubrication system that has capabilities of removing heat from a work area unlimited by the capacity of the particular lubricant used.

It is a further object of this invention to provide an improved lubrication system that performs the functions of lubricating the cutting operation, removing heat from the work area, and permitting the operator to view the cutting operation without sacrificing the removal of cuttings from the work area.

It is a still further object of this invention to provide an improved method of lubricating machining operations.

Yet another object of this invention is to provide an improved spraying or misting apparatus particularly adaptable to lubricating machine tool cutting operations, performing efficiently the functions of a successful lubrication system.

In its broader aspects, this invention comprises a method and apparatus for lubricating machine tool cutting operations, utilizing a spray or mist of lubricant. The method of lubricating machining operations comprises the application of lubricant to the cutting operation in mist form, thereby allowing the operator full view of the cutting operation at all times. The apparatus of this invention comprises, in its broader aspects, an improved control valve for the aspirating liquid whereby the desired lubricating mist is controllable and whereby the mist may be selectively shut off by an increased flow of aspirating fluid alone by simply depressing a single lever, and an improved aspirating fluid ejector and nozzle, the nozzle and valve being separated but connected by a flexible, semi-rigid conduit allowing the nozzle to be located for optimum mist application and the valve to be readily accessible to the operator without sacrificing versatility in selecting the direction of flow of the desired mist.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a view of the mist lubrication gun of this invention in perspective;

FIG. 2 is an enlarged, longitudinal sectional view of the apparatus shown in FIG. 1;

FIG. 3 is a bottom view of the aspirating fluid valve of this invention;

FIG. 4 is a fragmentary perspective view of another embodiment of the mist lubrication gun of this invention;

FIG. 5 is a side view of the embodiment of FIG. 4 partially shown in cross-section; and FIG. 6 is a fragmentary perspective view illustrating the use of the mist lubrication gun of the invention on a machine tool.

Referring now to the drawings, and more specifically to FIGS. 1, 2 and 3, a mist lubrication gun is shown comprising an aspirating fluid valve 10, a lubricating fluid valve 12, a flexible semirigid conduit 14 spacing apart and interconnecting valves 10 and 12 and combination ejector and nozzle 16.

Aspirating valve 10 comprises a valve body 18, preferably made of an easily machined metal, such as steel, having a two-diameter hole 20 drilled therethrough. Hole 20 has a small diameter portion 22 and a large diameter portion 24, approximately of equal lengths; portions 22 and 24 being interconnected by a relatively sharp straight taper 26 forming a valve seat. Valve body 18 also has two uniform diameter passageways: a relatively small passageway 28 and an intermediate passageway 30. Passageway 28 extends from its entrance into small portion 22 of hole 20 to its exit at a female conduit coupling 32. Intermediate passageway 30 extends from its entrance into valve body 18 at female conduit coupling 34 to its exit into large portion 24 of hole 20.

A valve spool 36, having ends 38 and 40, is loosely inserted into two diameter hole 20. Seals 42 and 44 are located on the shaft 36 at end 38 and at a position between ends 38 and 40, respectively. Seals 42 and 44 respectively comprise rings 46, coaxial with spool 36 and fixedly secured thereto or integrally formed thereon. Annular grooves 48 are machined in rings 46 so as to face the inside surface of two-diameter hole 20. Rings 46 are adjacent the inside surface of two-diametered hole 20, but are slightly smaller in diameter than hole 20; and O-rings 50 are inserted in grooves 48, thereby providing a seal between the inside surfaces of hole 20 and annular rings 46 and providing positioning support for spool 36 in the center of two-diameter hole 20. Spring 52 located within large portion 24 of two-diametered hole 20 and coaxial with spool 36 contacts spool end 38, thereby urging spool 36, which may now be more properly described as loose piston 56, into a position such that seal 42 rests against taper 26. Spring 52 is supported by a removable plug 54, inserted into portion 24 of two-diametered hole 20, having an abutment 58, cylindrical in shape and coaxial with coil spring 52 and extending from removable plug 54 into the center of coil spring 52, to limit depression of spool or piston 36 to a position in which the O-ring of seal 42 is just below the exit of passageway 30 and the O-ring of seal 44 is just above the entrance of passageway 28. With end 38 of spool 36 in contact with abutment 58, fluid is allowed to flow freely from passageway 30 into two-diametered hole 20 and from two-diametered hole 20 into passageway 28. With seal 42 engaging taper 26, flow between passageways 30 and 28 is completely shut off. There is thus provided between the positions just described an infinite number of valve positions, each restricting flow differently from the others and thereby producing a different mist.

Pivotally attached to valve body 18, adjacent portion 22 of two-diameter hole 20 is a lever 60. Lever 60 intermediate its ends and on one side of its fulcrum 62 engages end 40 of loose piston 56. Abutment screw 64 threadedly penetrates lever 60 on the other side of fulcrum 62 to abut the outside surface of valve body 18. By means of abutment screw 64, the swing of lever 60 may be adjusted so as to limit the upward movement of loose piston 56. Normally, adjustment is made by means of screw 64, so that the at-rest position of lever 60 corresponds to a desirable mist, and the fully depressed position of lever 60 corresponds to a flow solely of aspirating fluid.

Fixedly attached to valve body 18 but in no way operatively connected to valve 10 is lubricating flow valve 12. Valve 12 is preferably a conventional needle valve, such that the flow of lubricating fluid can be very closely controlled and can be fixed at a desirable flow rate by adjustment of knob 81. Also attached to valve body 18 but in no way operatively connected to valve 10 is a pair of magnetic units 74 removably secured to the bottom 66 and the two planar sides 68 of valve body 18 by means of pegs 70 and screws 72. Magnetic units 74 permit valve body 18 to be located and secured to a metal surface at any point adjacent the machining operation which is convenient to the operator, as suggested in FIG. 6.

As shown, and preferably, each magnet unit 74 is countersunk into a lateral surface of the body 18 and consists of an inner plate 75, an outer plate 77 and three blocks 79, 83 and 87 of "Alnico" or a similar magnetic alloy, arranged in reversed-polarity order, as indicated by the "N" and "S" legends applied thereto in FIG. 3.

Flexible semi-rigid conduit 14 is secured into valve body 18 in a direction toward the machining operation to be lubricated. Flexible conduit 14 comprises two equal dimension conduits 76 and 78 encased in a suitable plastic sheathing 80. Conduit 78 is connected to coupling 32 and forms an extension of passageway 28, thereby carrying aspirating fluid from valve 10 to the machining operation to be lubricated. Conduit 76 is similarly connected to coupling 82 of needle valve 12 thereby carrying lubricating fluid to the same machining operation. Conduit 14 is flexible permiting it to be bent so as to direct the mist onto the machining operation, but is also semi-rididgd so as to be self-supporting and to retain the configuration given thereto. In the preferred embodiment, conduit 78 is made of soft copper tubing, thereby providing the semi-rigid, self-supporting property of conduit 14 without sacrificing its flexibility. Conduit 76 in the preferred embodiment comprises a suitably flexible plastic tubing.

At the distal end of conduit 14 is located the combination ejector and nozzle 16. Ejector-nozzle 16 comprises two stepped-diameter passageways 84 and 85. Passageway 84 extends longitudinally, forms a continuation of conduit 78 and exits at the tip 86 of the nozzle 16. Stepped-diameter passageway 84 is divided into three portions, each of a different diameter. The entrance and first portion 88 has the largest diameter, a portion of which is threaded thereby forming the female section of a threaded and adjustable connector 90; the center and second portion 92 having the smallest diameter interconnects the first and third portions, forming a flow restriction therebetween, the first and second portions being connected by straight taper 93 and the exit and third portion 94 having a diameter intermediate the diameter of the first and second portions. The second stepped-diameter passageway 85 extends from the exterior surface 95 of nozzle 16 to, and interconnects with, the third portion 94 of passageway 84. Passageway 85 has two portions of different diameters, the entrance and first portion 96 having the larger diameter and a diameter that is slightly smaller than the outside diameter of conduit connector 98 so that conduit connector 98 may be frictionally secured in portion 96 of passageway 85 by merely inserting and pressing connector 98 home against the step separating the two portions 96, 97. The second and smaller diametered portion 97 of passageway 85 interconnects portion 96 and the third and exit portion 94 of the longitudinal stepped-diameter passageway 84. Center portion 92 of the longitudinal stepped-diameter passageway, the portion 97 of the second stepped-diameter passageway, and the conduit 98 all have approximately the same internal diameters. The entrance of portion 97 of passageway 85 into the third and exit portion 94 is made in perpendicular fashion adjacent but spaced apart from the step dividing portion 92 from portion 94. Aspirating fluid conduit 78 is connected by means of the female connector 90 to nozzle 16. The end 100 of conduit 78 is thereby inserted into the entrance and first portion 88 a partial distance thereof. Conduit 78 flares outwardly at end 100, forming one end of a relatively large, adjustable-volume pressure reduction chamber 102 between the conduit 78 and the center second portion 92 of the lateral stepped-diameter passageway 84. The other end of chamber 102 is formed by straight taper 93. Lubricating fluid conduit 76 is connected to connector 98 which may be a copper tube and which is in turn connected to the stepped-diameter passageway 94 as hereinbefore described.

In a specific embodiment of this invention, nozzle 16 is 9/16 inch in diameter and 1½ inches long. Entrance and first portion 88 of longitudinal stepped-diameter passageway 84 is 5/16 inch in diameter; second and intermediate portion 92 is .067 inch in diameter and 3/8 inch long; and exit and third portion 94 is .089 inch in diameter and 13/16 inch long. The second stepped-diameter passageway 85 enters the third portion 94 of the longitudinal stepped-diameter passageway 84 immediately adjacent the step between the second and intermediate portion 92 and the exit and third portion 94 thereof. The entrance and first portion 96 of the second stepped-diameter passageway 85 has a diameter of .089 inch and a length of 1/8 inch and the second portion 97 has a diameter of .059 inch and a length of 1/16 inch.

In operation, an aspirating fluid conduit 104 is connected to passageway 30 within valve 18 by means of female connector 34, thereby supplying aspirating fluid flow, such as air under pressure from an external source (not shown), to passageway 30. When abutment screw 64 is in such a position that seal 42 of loose piston 56 is abutting taper 26, there is no flow of aspirating fluid through valve 10. As lever 60 is depressed, aspirating fluid from passageway 30 flows past seal 42 into the portion 22 of the two-diametered hole 20, exiting by way of passageway 28 which connects with conduit 78 by means of female connector 32. Seal 44 prevents any aspirating fluid from blowing between piston 56 and the upper end of hole 20. By means of conduit 78, aspirating fluid is transported directly to nozzle 16.

Lubricating fluid conduit 106 similarly carries lubricating fluid under pressure from an external source (not shown) to needle valve 12, needle valve 12 being set for a desired flow of lubricating fluid into conduit 76 through the connector 82. Lubricating fluid is then transported by means of conduit 76 to nozzle 16. Until the aspirating fluid and the lubricating fluid reach nozzle 16, neither mixes with the other, since they are flowing through separate conduit systems 78, 76. At nozzle 16, lubricating fluid within conduit 76 is connected to the stepped-diameter passageway 85 by means of connector 98 and enters into the third and exit portion 94 of the longitudinal stepped-diameter passageway 84. The aspirating fluid within conduit 78 enters into pressure reduction chamber 102 by means of tapered opening 100, then flows through second and intermediate portion 92 of the longitudinal stepped-diameter passageway of nozzle 16 and into the third and exit portion 94 of the same. As the aspirating fluid passes by the exit opening of passageway 85, the lubricating fluid is ejected into the aspirating fluid stream. The ejector operates on the reduced pressure in the exit and third portion 94 of the longitudinal stepped-diameter passageway 84 of nozzle 16 caused by the aspirating fluid flow through relatively restricted intermediate portion 92 and the expansion of the same into the relatively larger third and exit portion 94. The third and exit portion 94 of the longitudinal stepped-diameter passageway 84 of nozzle 16 has an appreciable length between the entrance of stepped-diameter tube 85 and exit 86; this length is primarily used for mixing the lubricating fluid with the aspirating fluid so that upon exit at 86 a very finely divided and uniform mist is produced. The amount and velocity of the mist thus provided depends upon the adjustments of screw 64 and knob 81, and to some extent upon the adjusted size of the chamber 102.

When lever 60 is fully depressed so that end 38 of loose piston 56 engages abutment 58, the flow in passageway 30 into hole 20 and through passageway 28 is relatively unrestricted. Flow in conduit 78, while lever 60 is in this position, is then maximized, so that when aspirating fluid enters pressure reduction chamber 102 and flows through intermediate and restricting portion 92 of the longitudinal stepped diameter passageway 84 of nozzle 16, the pressure in exit and third portion 94 is sufficient to stop the flow of lubricating fluid within stepped diameter passageway 85 and thereby provide a flow from nozzle 16 solely of aspirating fluid. It is thus seen that by fully depressing lever 60, the ejection of mist from nozzle 16 is terminated, a jet of aspirating fluid alone remaining.

Referring now to FIGS. 4 and 5, wherein like parts are similarly numbered, another embodiment of this invention is shown. In this embodiment, the needle valve 12 is not used, but in its place stream separator 108 is inserted in the path of flow of both the lubricating fluid and the aspirating fluid. Stream separator 108 is securely attached to valve 10 by means of a normal pipe coupling 110 which is threadedly inserted in female coupling 32 and connected at the other end to a male coupling 112 which is a fixed part of stream separator 108. Aspirating fluid flow from passageway 28 and pipe coupling 110 enters into stream divider 108 by means of passageway 114. Passageway 114 and pipe coupling 110 are of the same inside diameter as passageway 28, forming extensions thereof. Passageway 114 enters into a perpendicular passageway 116 of the same diameter intermediate its ends, thereby splitting the stream of passageway 114 into halves. At both ends of passageway 116, passageways 118 exit therefrom into a pair of conduits 78a, 78b. In another portion of stream separator 108 is located an entrance passageway 120 into which lubricating fluid conduit 106 is connected. Similarly to passageway 114, passageway 120 enters into a perpendicular equi-diametered passageway 122 intermediate its ends. At both ends of passageway 112, connectors 124 connect thereto and exit from stream splitter 108 into a pair of conduits 76a, 76b. Intermediate the entrance of passageway 120 into passageway 122 and the exits from passageway 122 to connector 124 are located two conventional valves 126 having adjustable control knobs 128a, 128b, biased by springs 130, thereby securing any adjustment made to control knobs 128a, 128b when a desired lubricant flow is selected. Each conduit 76 is paired with a respective conduit 78, as shown.

The respective pairs of conduits 76 and 78 are encased in sheaths 80a, 80b similarly to the embodiment of FIGS. 1 and 2, forming a pair of flexible, semi-rigid conduits 14a, 14b, each having at the distal end a nozzle-ejector 16 as described hereinabove. The embodiment of FIGS. 3 and 4 is otherwise identical with the embodiment of FIGS. 1 and 2 in both structure and operation.

Before operating either of the embodiments described above, however, valve body 18 is located conveniently to the operator, by means of magnet units 74. Fluid conduits 104 and 106 are then connected to valves 10 and 12 respectively and adjustments are made to abutting screws 64 and knob 81 or screw adjustments 128 so that the desired mist for the specific lubrication problem encountered flows from nozzle 16 when the lever 60 is at its normal or "at rest" position determined by the setting of screw 64. At this time, lever 60 should be fully depressed to see if the pressure within conduit 78 is sufficient to stop the flow of lubricant in passageway 85 of nozzle 16. In the specific embodiment described above, the pressure within conduit 78 must take on values in excess of 50 p.s.i.g. for this purpose. After all of the adjustments are made, flexible conduit 14 is directed or bent so as to direct the mist emitted from nozzle 16 properly toward the machining operation to be performed.

Referring now to FIG. 6, there is shown for illustrative purposes a portion of a conventional lathe 129 having a headstock 130 including a chuck 131 in which work piece 132 is secured. Cross slide 133 is mounted for longitudinal movement on rails 134 and carries tool holder 135, to which in turn tool 136 is secured. It will be observed that valve 10 may conveniently be attached to cross slide 133 by means of magnet units 74 so that lever 60 is readily accessible to the operator. Flexible conduit 14 is then bent so that nozzle 16 directs the mist upon the point of engagement of tool 136 with work piece 132, as shown at 137.

It may readily be seen that this lubrication system and method has some unique advantages over the more conventional flowing liquid bath type system. A mist system, because of the relatively fine particles of lubricant carries lubricant to areas which a flowing liquid may leave dry. Another unique property of such a lubrication system is that it may be multidirectional by means of the second embodiment hereinabove described (FIGS. 4 and 5) using several nozzles. Since a mist or spray lubrication system such as the one described above gives the operator more precise control over the amount of lubricant used and where it is applied, less lubricant may be required. Further, as the mist evolving from nozzle 16 is composed of very finely divided particles of lubricant, the mist as a whole is generally tralucent, thereby allowing the machine operator's view of the machining operation to be relatively unobstructed. It has been found through experience that a cutting operation that can be viewed constantly by the operator proceeds at an appreciably faster rate, without loss of accuracy, than those lubricated by conventional means.

Still further, a mist lubrication system has the unique advantage of being able to carry away heat from a machining operation in excess of what is normally extracted in a fluid flow lubrication system. This advantage is attributable to the fine lubricant droplets that impinge upon those parts heated by the cutting operation, the rate of heat transfer from the relatively warm parts to the fine droplets is appreciably faster than that to a flowing stream. Further than this, the fine droplets are easily vaporized, thereby not limiting the amount of heat transferable from the relatively warm parts by the heat capacity of the lubricant; rather, limiting the heat transferred to the particle by the additive effects of the heat capacity and the heat of vaporizaion of the lubricant. Admittedly, when heat transfer to the lubricant results in vaporization, some lubricant is lost. However, in some costly machining operations, the cost of lubricant, even where the lubricant cannot be reused, could be disregarded. Further, as in many low cost mist lubricated machining operations, either less lubricant is used or cheaper lubricant is satisfactory than with conventional lubrication systems, evaporation and complete loss of lubricant may still be feasible. In addition, while no apparatus is herein disclosed for recovering vaporized lubricant, there are many conventional ways of condensing such vapors by which a portion of the vaporized lubricant would be saved.

In a successful lubricating system, the cuttings must be removed from the machining area. While using the misting apparatus herein described, if the mist does not suffice to carry away the machine cuttings, full depression of valve 60 produces a jet of aspirating fluid alone by which cuttings are easily blown away. Lever 60 allows the operator to change from a lubricating mist to a jet of aspirating fluid alone practically instantaneously, so that in many machining operations the removal of cuttings by this method may take place without interrupting the cutting process.

While we have described above the principles of our invention in connection with specific apparatus, it is to be clearly understood that this description is made only by way of example and not as a limitation to the scope of our invention.

We claim as our invention:

1. A mist lubrication gun comprising: a first lubricating fluid conduit; a second aspirating fluid conduit; means for selectively controlling the flow of aspirating fluid in said second conduit; nozzle means for mixing said fluids and producing a mist, said nozzle means being formed to provide a straight-through passage defining an expansion section at its proximal end, an intermediate, restricted section and an enlarged mixing section at its distal end, said aspirating fluid conduit being axially connected to the proximal end of said passage and said lubricating fluid conduit being substantially radially connected to the mixing section of said passage at a point adjacent the distal end of said intermediate section; and means for selectively directing said mist; said aspirating fluid controlling means cooperating with said fluid mixing means selectively to vary the density of said mist and selectively to interrupt the flow of said lubricating fluid to provide a flow solely of aspirating fluid.

2. A mist lubrication gun comprising: a first lubricating fluid conduit; a second aspirating fluid conduit, said second conduit being relatively larger than said first conduit; a first valve connected to said first conduit selectively for controlling the flow of said lubricating fluid; a second valve connected to said second conduit for selectively controlling the flow of said aspirating fluid; an aspirating nozzle for mixing said fluids to provide and eject a mist; and a first elongated, flexible, semi-rigid and self-supporting conduit interconnecting said nozzle and one of said valves; a second elongated conduit interconnecting said nozzle and the other of said valves; said second valve including means for selectively adjusting the same between fully open and fully closed positions through an intermediate position thereby varying the aspirating fluid flow between maximum and minimum rates through an intermediate rate, said nozzle being proportioned to interrupt said lubricating fluid flow and said mist in response to said maximum aspirating fluid flow thereby to eject a jet of aspirating fluid alone; said second valve including means for normally retaining said selectively adjustable means in a predetermined intermediate position thereby normally to provide a predetermined density mist.

3. The mist lubricating gun of claim 2 further comprising a single lever member for actuating said selectively adjustable means; and wherein said retaining means comprises an adjusting screw cooperating with said lever member for selectively retaining the same in a predetermined position, said screw inhibiting movement of said lever member in a direction to move said selectively adjustable means toward said fully closed posiiton but permitting movement of said lever in a direction to move said selectively adjustable means toward said fully open position.

4. The mist lubrication gun of claim 2 wherein said nozzle comprises a stepped-diameter passageway having an entrance portion of relatively small diameter and an exit portion of relatively large diameter, and a second passageway intersecting said exit portion of said stepped-diameter passageway distally adjacent the step between said portions, whereby an aspirating fluid flowing in said stepped-diameter passageway mists an aspiratable fluid flowing in said second passageway and upon an increased flow of said aspirating fluid, said aspiratable fluid flow is cut off and only said aspirating fluid flows from said nozzle.

5. A spray nozzle comprising: a stepped-diameter passageway having an entrance portion of relatively small diameter and an exit portion of relatively large diameter, and one only second passageway intersecting said exit portion of said stepped-diameter passageway adjacent the step between said portions, said passageways providing means whereby a compressible aspirating fluid flowing through said entrance portion and thence through said exit portion of said stepped-diameter passageway mists an aspiratable fluid flowing in said second passageway and upon an increased flow of said aspirating fluid, said aspiratable fluid flow is cut off and only said aspirating fluid flows from said nozzle.

6. A spray nozzle for a misting device which includes a source of liquid and a source of air under pressure, conduit means connected to said liquid source, conduit means connected to said air source and valve means connected in said last conduit means; said nozzle being formed to provide a straight-through passage adapted at its proximal end for connection to such an air conduit means and defining an intermediate restricted section and an enlarged mixing section at its distal end, said nozzle further being formed with one only substantially radial port opening into said mixing chamber adjacent the distal end of said intermediate section and adapted for connection to such a liquid conduit means, whereby air flowing through said restricted section and thence past said port and through said mixing section will mist liquid supplied through said liquid conduit and, upon an increased flow of air, will cut off liquid flow and be emitted from the distal end of said nozzle as an air jet.

References Cited by the Examiner

UNITED STATES PATENTS

| 1,855,457 | 4/1932 | Murray | 239—413 |
| 2,309,260 | 1/1943 | Strauss | 82—1 |
| 2,417,242 | 3/1947 | Eckel | 251—321 |
| 2,850,323 | 9/1958 | Veres | 239—413 |
| 2,908,227 | 10/1959 | McDougall | 239—407 |
| 2,917,244 | 12/1959 | Gould | 239—586 |
| 2,957,630 | 10/1960 | Lamb | 239—85 |
| 3,042,312 | 7/1962 | Packard | 239—586 |
| 3,042,315 | 7/1962 | Besser | 239—413 |
| 3,104,826 | 9/1963 | Morris | 239—413 |
| 3,106,346 | 10/1963 | Thomas | 239—413 |
| 3,131,869 | 5/1964 | Vega et al. | 239—413 |
| 3,135,148 | 6/1964 | Cole et al. | 82—1 |
| 3,194,501 | 7/1965 | Cape | 239—576 |

M. HENSON WOOD, JR., *Primary Examiner.*

WILLIAM W. DYER, JR., *Examiner.*

L. VLACHOS, R. STROBEL, *Assistant Examiners.*